United States Patent [19]

Campbell et al.

[11] Patent Number: 5,372,825
[45] Date of Patent: Dec. 13, 1994

[54] SPOONABLE SOURED LOW-FAT NON-DAIRY CREAMS

[75] Inventors: Iain J. Campbell, Wellingborough, Great Britain; Pascale Fournier, Paris, France; Wayne G. Morley, Wellingborough; Ian T. Norton, Rushden, both of Great Britain

[73] Assignee: Van den Bergh Foods, Company, Division of Conopco, Inc., Lisle, Ill.

[21] Appl. No.: 971,529

[22] Filed: Oct. 28, 1992

[30] Foreign Application Priority Data

Oct. 31, 1991 [EP] European Pat. Off. ........ 91310098.8

[51] Int. Cl.$^5$ .......................... A23C 13/16; A23L 1/19
[52] U.S. Cl. ......................... 426/42; 426/33; 426/34; 426/41; 426/2; 426/43; 426/580; 426/583; 426/585; 426/586; 426/613
[58] Field of Search ................. 426/7, 33, 34, 41, 42, 426/43, 580, 583, 585, 586, 601, 602, 613

[56] References Cited

U.S. PATENT DOCUMENTS

| | | | |
|---|---|---|---|
| 3,433,643 | 3/1969 | Tatter et al. | 426/33 |
| 3,443,960 | 5/1969 | Noznick et al. | 426/33 |
| 4,199,608 | 4/1980 | Gilmore et al. | 426/570 |
| 4,288,459 | 9/1981 | Baker | 426/43 |
| 5,190,781 | 3/1993 | Van Heteren et al. | 426/521 |

FOREIGN PATENT DOCUMENTS

| | | |
|---|---|---|
| 483896 | 5/1992 | European Pat. Off. . |
| 1692584 | 8/1971 | Germany . |
| 8016636 | 1/1983 | Japan ..................... 426/34 |
| 309836 | 7/1930 | United Kingdom . |

OTHER PUBLICATIONS

Hawley, G. G., The Condensed Chemical Dictionary, 1981, p. 535, Van Nostrand Reinhold Company, New York.
Dictionnaire Laitler, (1981) p. 62.
J. Dairy Science 1986, Ann. Meeting Am. Dairy Sci Ass, 74 (1991), Suppl. 1.

*Primary Examiner*—Jeanette Hunter
*Attorney, Agent, or Firm*—A. Kate Huffman

[57] ABSTRACT

Soured, water-continuous creams that are free of emulsifiers and that contain 5–15 wt % of at least a vegetable fat and that further contain a protein component and a thickener composition were found to be stable and spoonable.

15 Claims, No Drawings

SPOONABLE SOURED LOW-FAT NON-DAIRY CREAMS

BACKGROUND OF THE INVENTION

Spoonable creams are well known in Great Britain. Although the rheological parameters of creams and emulsions are defined in P. Sherman, Emulsion Science, Academic Press 1968, the term spoonable is not defined therein. According to our definition, a spoonable cream should display the following theological behaviour at 5° C.

1) the yield value (also called: yield stress) should be more than 50 Pa extrapolated from shear rates between 100–300 $S^{-1}$ (Bingham);
2) the Bingham viscosity should be less than 500 mPa s between shear rates of 100–300 $S^{-1}$;
3) the failure to stress should occur at a strain of less than 0.5 Radians, preferably less than 0.1 Radians.

Yield values and Bingham viscosities were determined utilising the Carrimed Rheometer. Measurements were performed at 5° C., using 4° cone and plate geometry. The shear stress was increased from zero at a rate of 60 Pa/min, and shear rates were measured until values in excess of 600 $s^{-1}$ were achieved. The experiment was then terminated. A graph of shear stress vs shear rate was plotted, and a straight line fitted to the curve between the shear rates of 100–300 $s^{-1}$. The slope of this line was the Bingham viscosity. The yield stress was determined by extrapolation of this line back to zero shear rate.

The failure to stress measurements were determined utilising the Carrimed Rheometer. Measurements were performed at 5° C., using a 4° cone and plate geometry. The experiments performed were torque sweeps in oscillation mode. The samples were oscillated at a frequency of 1 Hz, as the torque was increased from 50–5000μNm in thirty steps. The measurement time at each torque value was 10 sec, and the time between measurements was 5 sec. The parameters measured were storage modulus ($G^I$), loss modulus ($G^{II}$) and strain (in radians). A graph of $G^I$ and $G^{II}$ vs strain was then plotted. At low strain values the samples displayed solid-like characteristics, and $G^I > G^{II}$. At higher strain values $G^{II} > G^I$ and the failure to stress was defined as the strain at which $G^I = G^{II}$.

Low fat soured creams, based on dairy fats are known from J. of Dairy Science 86, Ann. Meeting Am. Dairy Sciency Ass 74 (1991), Aug. 12–15, Suppl. 1. These creams contain stabilisers, such as gelatin, modified starch, guar gum, locust bean gum, carrageenan, or pectins. As the rheological parameters are not mentioned, it remains unanswered whether these products meet our criteria for spoonability.

It is further known from DE 1,692,584 that unctuous food products, based on milk protein and vegetable fat (fat contents: 1–50 wt %) can be obtained when the compositions contain edible organic acids and an emulsifier combination and optionally a small amount of gelatin. According to this document it is essential that a combination of different locust bean gums is present. It can not be concluded from this document, whether the rheology of the product makes it spoonable or not.

It is for the purpose of obtaining healthier products, i.e. products containing more unsaturated or at least fewer saturated fatty acid moieties, that attempts have been made to produce a low-fat equivalent of a soured, spoonable dairy cream. However, so far any efforts to produce a soured, spoonable low-fat cream, thus one containing at least a vegetable fat in levels up to 15 wt. % with the desired properties have been unsuccessful: Either the stability or the rheology of the creams was insufficient.

Therefore, so far no low-fat equivalent of a soured, spoonable non-dairy cream with the required properties was available.

SUMMARY OF THE INVENTION

We have now found a solution to the problems mentioned above. Therefore, our invention is concerned in the first place with soured, water-continuous creams free from emulsifiers, comprising 5–15 wt. % of at least a vegetable fat, optionally mixed with butterfat or fractions thereof a protein component and a thickener system, which soured creams are stable and spoonable. In this respect, the term stable is defined as: the cream can be stored for at least 14 days at a temperature of 0°–15° C., such that the rheology remains within our definition of spoonable, no serum leakage occurs, and the cream remains microbiologically stable.

DETAILED DESCRIPTION OF PREFERRED EMBODIMENTS

We have defined spoonable based on standard rheological tests. Such tests have been discussed by Sherman.

The pH of our soured, spoonable non-dairy creams is in general 4.0–4.8, preferably 4.4–4.6.

Although the fat level of our new compositions can range from 5–15 wt. %, it is preferred to use fat levels of less than 10 wt. %.

The fats that can be used in our creams are butterfat and the well-known vegetable fats. Preferred fats, however, are: palmkernel oil, soybean oil, rapeseed oil, coconut oil, sunflower oil, safflower oil, butterfat or fully or partially hardened fractions thereof. It should be noted here that butterfat is only applied in admixture with a vegetable fat.

It is also possible to use indigestible "fats" such as the well-known sucrose poly fatty acid esters (SPE's) as "fat" component in our creams.

The butterfat is preferably present in an amount of 2–10 wt. % calculated on the basis of the total cream.

Although the highest data for yield stress are obtained when firm (i.e. hardened) fat blends are used, it is possible to use fat compositions that are completely liquid. As these liquid fats are normally highest in unsaturated fatty acids, these compositions will be the healthiest.

In order to obtain good taste, the correct acidity level, but also good rheological properties, it is preferred that a protein component be present in our compositions. Very suitable milk protein components are buttermilk powder (B.M.P) and skimmed milk powder (S.M.P).

The amounts of B.M.P and/or S.M.P are suitably between 0.1–10.0 wt. % (calculated on the total cream), preferably between 0.3 and 2.0 wt. %.

Because of the low fat levels of our creams it is difficult to produce a spoonable low-fat non-dairy cream that also displays an acceptable yield stress (i.e. yield stress of more than 50 Pa). We have found that the desired yield stress can be obtained when a thickener system is incorporated into our new creams. The thickeners can be selected from the group consisting of locust bean gum, guar gum, alginate, carrageenan, microcrystalline cellulose, but also starches and hydrolyzed starches can be used.

The starches can be derived from any source, such as rice, maize, potato or tapioca.

The amount of thickener that is required depends on the fat system used. In general, amounts of 0.2-20.0 wt. %, preferably 0.4-10.0 wt. %, give very suitable results (on the basis of the total cream).

Another important factor for the rheological and organoleptic properties of our non-dairy creams is the droplet size of the fat droplets in our emulsions. The droplet size should preferably not be greater than 5.0 µm, more preferably less than 2.0 µm.

The invention is further concerned with a process for the preparation of a soured cream. This process comprises at least the steps of:

making at least one pre-mix of fat(s), protein component(s), in particular B.M.P and/or S.M.P, thickeners and water or skimmed milk at a temperature of 40°-100° C.;
cooling the pre-mix(es) to 40°-70° C.;
homogenizing the pre-mix(es) in at least a single stage under pressure;
cooling the homogenized pre-mix(es) to a temperature of 5°-30° C.;
adding to the pre-mix(es) a culture medium capable of converting lactose into lactic acid by fermentation;
fermenting the pre-mix(es) until a pH=4.0-4.6;
where appropriate, mixing the fermented premix(es);
storing the fermented mixture at a temperature of less than 15° C., preferably 0°-10° C.

In the above-mentioned process the homogenization pressure is preferably in the range of 10-250 bar. If the pressure is above 100 bar, then a second stage homogenization of 20-100 bar is required.

This process is applied for the preparation of the soured, spoonable non-dairy creams as disclosed above.

EXAMPLE I

A non-dairy cream comprising 10 wt % of fat was prepared with the following composition

|  | wt % |
| --- | --- |
| palm kernel oil m.p. 38° C. | 10.0 |
| Skimmed milk | 78.0 |
| Skimmed milk powder | 10.0 |
| Starch | 1.5 |
| Thickener (LBG) | 0.5 |

The dry ingredients were dispersed in skimmed milk at 90° C. The premix was cooled to 60° C., whereupon the palm kernel oil was added. The emulsion was homogenised at a pressure of 100 bar and pasteurized. It was cooled to 5° C. and stored overnight. 1% of a culture medium was added, and the cream kept at 25° C. for 22 hours. It was finally stored at 5° C.

The rheological data were as follows:

| Extrapol. yield stress | 140 Pa |
| --- | --- |
| Bingham visc. | 145 mPa · s |
| Failure to stress | 0.013 radians |

EXAMPLE II

Example I was repeated, except that 10% sunflower oil was used instead of 10% palm kernel-38. The theological data were:

| Extrapol. yield stress | 179 Pa |
| --- | --- |
| Bingham visc. | 148 mPa · s |
| Failure to stress | 0.021 radians |

We claim:

1. A soured, water-continuous cream that is free of emulsifiers consisting essentially of
   5-15 wt % of a fat selected from the group consisting of vegetable fat, a vegetable fat admixed with a butter fat, a vegetable fat admixed with fractions of butterfat and mixtures thereof;
   a protein component,
   a microorganism culture capable of converting lactose into lactic acid by fermentation to form a soured, water-continuous cream having a pH of 4.0 to 4.6; and
   a thickener composition,
   provided the soured cream is free of any emulsifier and is stable and spoonable and has the following characteristics:
   a. a yield value of more than 50 Pa extrapolated from shear rates between 100–300 $S^{-1}$ (Bingham),
   b. a Bingham viscosity of less than 500 mPas between shear rates of 100–300 $S^{-1}$, and
   c. failure to stress at a strain of less than 0.5 Radians.

2. A soured cream according to claim 1, wherein the pH of the cream is 4.0-4.8.

3. A soured cream according to claim 1, wherein the fat level is less than 10 wt %.

4. A soured cream according to claim 1, wherein the fat is selected from the group consisting of butterfat, palmkernel oil, Soybean oil, rapeseed oil, coconut oil, sunflower oil, safflower oil, sucrose poly fatty acid esters or fully and partially hardened fractions thereof with the pre-requisite that the fat never consists of butterfat or butterfat-fractions only.

5. A soured cream according to claim 4, wherein the butterfat is present in amounts of 2-10 wt. % of the total cream.

6. A soured cream according to claim 1, wherein the cream contains 0.1-10.0 wt. % of buttermilk powder or skimmed milk powder as protein component.

7. A soured cream according to claim 6, wherein the level of buttermilk powder or skimmed milk powder is 0.3-2.0 wt. %.

8. A soured cream according to claim 1, wherein the droplet size of the fat droplets is less than 5.0 µm.

9. A soured cream according to claim 1, wherein 0.2-20.0 wt. %, on the basis of the total cream of a thickener system is present.

10. A soured cream according to claim 9, wherein the thickener system a compound selected from the group consisting of locust bean gum, guar gum, alginate, carrageenan, microcrystalline cellulose and starch.

11. A soured cream according to claim 1 wherein the fat is a liquid oil.

12. A soured cream according to claim 1, wherein the droplet size of the fat droplets is less than 2.0 µm.

13. A soured cream according to claim 1, wherein the thickener system is present in an amount of 0.4-10.0 wt % based on the total cream.

14. A process for the preparation of a soured, water-continuous cream consisting essentially of the steps of:
   a. selecting a protein component, a thickener composition and water or skimmed milk provided that there is no emulsifier selected;
   b. selecting a vegetable fat selected from the group consisting of a vegetable fat, a vegetable fat admixed with butterfat, a vegetable fat admixed with fractions of butterfat or mixtures thereof;
   c. preparing a pre-mix of the components of steps a. and b. by heating the components to a temperature of 40°–100° C.;
   d. cooling the pre-mix to a range of 40°–70° C. to prepare a cooled pre-mix;
   e. homogenizing the cooled pre-mix in a single stage under pressure to form a homogenized pre-mix;
   f. cooling the homogenized pre-mix to a temperature of 5°–30° C.;
   g. adding a microorganism culture capable of converting lactose into lactic acid by fermentation to the homogenized pre-mix to form a fermented pre-mix having a pH of 4.0 to 4.6; and
   h. storing the fermented pre-mix at a temperature of less than 15° C. to form a soured, water-continuous cream.

15. A process according to claim 14, wherein the homogenizing step is a single-stage homogenation procedure applying a pressure of 10–250 bar.

* * * * *